United States Patent
Santangelo et al.

(10) Patent No.: US 12,326,832 B2
(45) Date of Patent: Jun. 10, 2025

(54) SYSTEM AND METHOD TO DYNAMICALLY PRIORITIZE DEBUG LOG COLLECTION FOR IMPROVED NETWORK TRANSMISSION

(71) Applicant: Dell Products L.P., Round Rock, TX (US)

(72) Inventors: Dominick Santangelo, Raleigh, NC (US); Vishal Tiwary, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 18/166,714

(22) Filed: Feb. 9, 2023

(65) Prior Publication Data

US 2024/0273061 A1 Aug. 15, 2024

(51) Int. Cl.
*G06F 16/00* (2019.01)
*G06F 16/11* (2019.01)
*G06F 16/17* (2019.01)

(52) U.S. Cl.
CPC ........ *G06F 16/122* (2019.01); *G06F 16/1724* (2019.01)

(58) Field of Classification Search
CPC .......................... G06F 16/122; G06F 16/1724
USPC ....................................................... 707/642
See application file for complete search history.

(56) References Cited

U.S. PATENT DOCUMENTS

| | | | |
|---|---|---|---|
| 10,528,451 B2* | 1/2020 | O'Dowd | G06F 16/345 |
| 2012/0110580 A1* | 5/2012 | Ghosh | G06F 9/5083 |
| | | | 718/100 |
| 2012/0159261 A1* | 6/2012 | Maybee | G06F 11/323 |
| | | | 714/E11.212 |
| 2022/0020108 A1* | 1/2022 | Uhrenholt | G06F 9/30123 |
| 2022/0058073 A1* | 2/2022 | Poghosyan | G06F 11/3476 |
| 2022/0398185 A1* | 12/2022 | Mueller | G06F 11/079 |
| 2023/0033059 A1* | 2/2023 | Zhu | G06F 16/278 |

* cited by examiner

*Primary Examiner* — Incent F Boccio

(74) *Attorney, Agent, or Firm* — Dergosits & Noah LLP; Todd A. Noah

(57) ABSTRACT

Systems and methods for on-site filtering and prioritizing logged data prior to transmission to a support server are described. An analyzer application executing on the same system as a filesystem application may retrieve a core file dump in response to an unexpected behavior. An actively running thread at the time of the unexpected behavior may be identified, and thread relationship rules are used to generate a list of related threads based on sharing a common resource with the actively running thread. A relevance factor may be determined for each of the sub-components of the related threads based on a positioning within a hierarchical tree of the related threads. Log files from the sub-components may then be selected for a support file bundle, based on the relevance factors and the file sizes of the log files fitting within a size limit, then transmitted to the support server.

20 Claims, 6 Drawing Sheets

SYSTEM AND METHOD TO DYNAMICALLY PRIORITIZE DEBUG LOG COLLECTION FOR IMPROVED NETWORK TRANSMISSION

TECHNICAL FIELD

This disclosure relates to transmitting logged data in response to a file system crash, and more particularly, automatically filtering and prioritizing the logged data prior to transmission to more efficiently provide relevant logged data to back end services for additional analysis.

BACKGROUND

When a deduplicating filesystem, such as the Data Domain™ File System provided by Dell EMC Corporation (Dell EMC), crashes on a remote customer system, various artifacts such as logs, core dumps containing the process's memory, and performance data may be collected and transmitted to technical support so that they may better debug and resolve the customer issue. To simplify managing and transferring these pieces of information, the relevant files may be collected in a single location and combined into some archive format (such as the .tar format). The resulting collection, or support bundle, may then be passed to technical support by a conventional large-data transfer mechanism such as FTP. Creation of these support bundles may be manually initiated or automatically done at the time of the crash.

Conventional implementations of log collection may use a predefined list of files to gather every time a support bundle is generated. Often this means collecting as many logs for as many possible situations, with no size constraints, which has a number of disadvantages. Collecting a common set of files for every support bundle can result in bundles containing large amounts of information that are irrelevant for resolving the underlying issue. Furthermore, excessive data collection may unnecessarily increase the size of the support bundle. This may increase the time to transfer the bundle to support leading to a slower turnaround time for issue resolution. Manually created support bundles containing only the "right" files may be created too long after the crash occurred leading to missing data as the result of logs rolling over. Additionally, some methods for automatically sending crash data analysis back to support may be limited by the size of the files being sent. Support bundles which are too big may not be able to collect automatically which means less information for support in resolving crashes they have been notified of but have not been contacted about by the customer. Finally, unnecessary data from support bundles may accumulate on support's storage systems, leading to greater storage infrastructure requirements for no gain.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
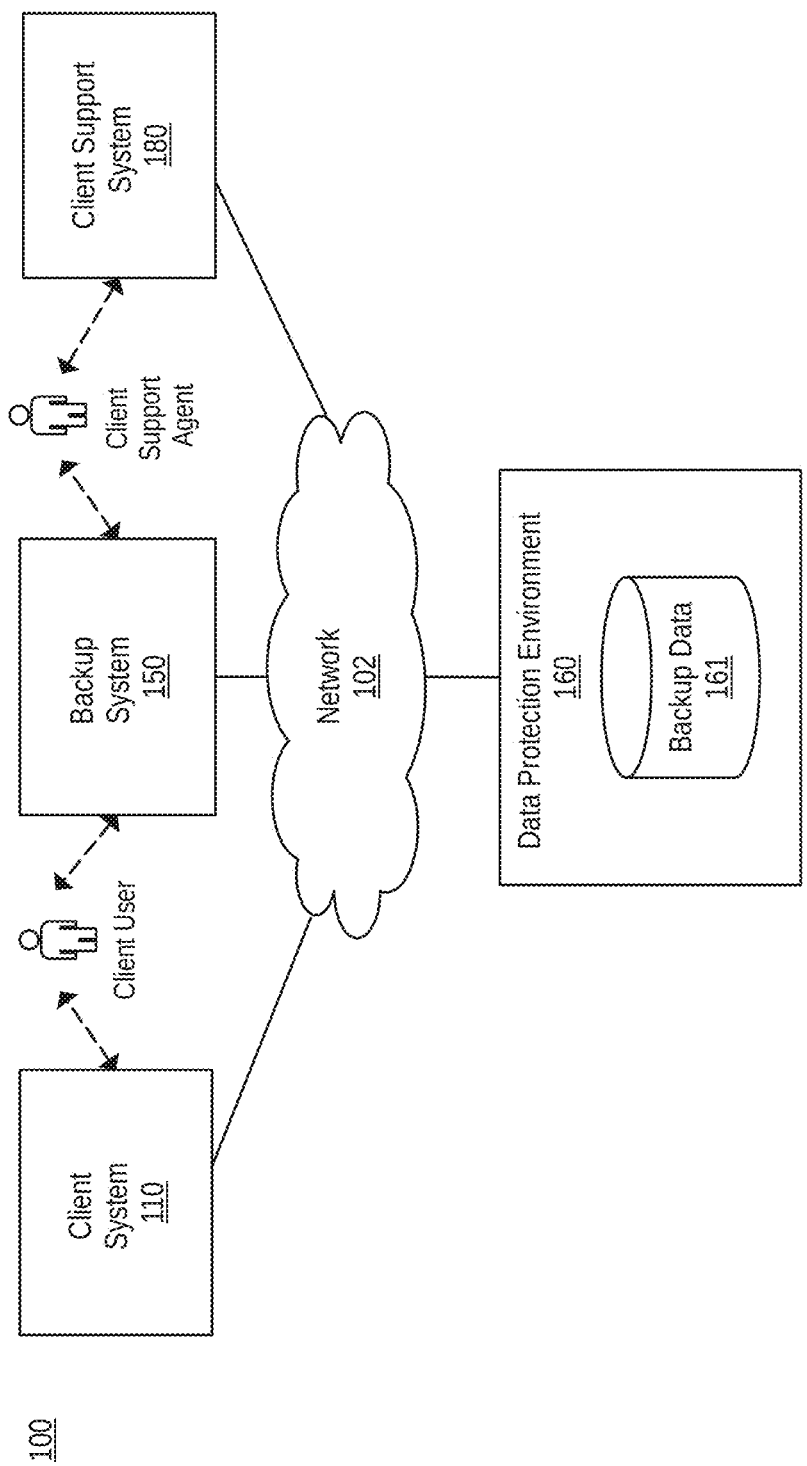
FIG. 1 is a block diagram illustrating an example operating environment for on-site filtering of logged files at the time of a file system crash before transmission, according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) which performs automated analysis of the contents of a filesystem service's process memory directly on-system at the time of the crash to identify files for inclusion in an automated support bundle which have a higher likelihood of being relevant to why the filesystem service crashed. The system may then filter the files to fit within some arbitrary constraint such as file size. This should produce a support bundle of fixed size containing the most valuable information related to the crash. Should this support bundle be made to fit within the telemetry requirements on the customer system, it may then be transferred to support automatically over the telemetry channel to a remote analysis server to identify causes for the crash.

The system described herein may analyze the filesystem service's process memory by examining the panicking thread in the core dump, determining any related threads, and recording what filesystem sub-components are involved in this thread list. These sub-components may have lists of specific logs associated with them, as well as weights for the relative importance of the log to that component, which can be used when determining what files to include. This aggregated list of files based on sub-components may not fit within the required space constraints, so further filtering must occur to reduce the aggregate size of the files. The system may accomplish this by further excluding entire files based on priority weights specific to the files and their level of relevance to the crash.

In some embodiments, such systems may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g., Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for securely authorizing service level access to a system according to one or more embodiments of the disclosure.

As shown, the operating environment 100 may include a client system 110, a backup system 150, a data protection environment 160, and a client support system 180. It should be noted that the components of operating environment 100 may interact via a network 102, which may be any type of wired or wireless network including a local area network (LAN), a wide area network (WAN), or a direct communication link, or other suitable connection.

The client system 110 may be associated with a client (or customer) of a data protection platform and act as a client from which data to be protected (e.g., backed-up) originates. The client system 110 may host one or more client applications and may be associated with data that is stored and/or backup up to the data protection environment 160. The client system 110 may also be associated with a client user such as a backup administrator that interacts with the backup system 150.

In some embodiments, the backup system 150 may include one or more components that are associated with providing data protection and recovery services. For example, the backup system 150 may include a backup server or appliance. The backup system 150 may be an on-premises (e.g., maintained by a customer or client of the data protection and recovery services), or part of a cloud-based system provided as part of an on-demand service. The backup system 150 may direct (or control, initiate, etc.), or work in conjunction with, other components of the operating environment 100 to perform various operations as further described herein. In addition, the backup system 150 may provide an interface (e.g., application programming interface (API), graphical user interface (GUI), command line interface (CLI), etc.) that allows a user to interact with the backup system 150, or particular components thereof. In addition, the backup system 150 may manage one or more user accounts (or access levels) that have differing privileges as further described herein.

In some embodiments, the backup system 150 may include, or work in conjunction with one or more backup components including a backup application that performs (or manages, coordinates, etc.) the creation and restoration of data that may be backed-up. The backup components may include a backup appliance such as a Dell EMC CloudBoost appliance, although any suitable appliance is contemplated. In addition, the backup components may include a backup server that may be implemented in conjunction with a Data Domain deduplication storage server provided by Dell EMC for use with Data Domain™ Restorer (DDR) storage devices. In some embodiments, the backup server may be a Dell EMC Avamar server or a Dell EMC Networker server, although no particular server is required, and other backup and storage system configurations are contemplated. It should be noted that components of the backup system 150 (e.g., backup application, backup appliance, or backup server) can be implemented in various forms, such as a virtual, physical, or native public cloud appliance to fit the requirements of a particular configuration.

The data protection (or backup storage) environment (or system) 160 may store backup data (or data) 161. The data protection environment 160 may also store metadata for the backup data 161 and include one or more instances of a filesystem that catalogs files and other data residing in the data protection environment 160. In general, the storage of backup data 161 may be configured to store client system 110 data backups that can be restored in the event of a loss of data.

The client support system 180 may be associated with a provider of a data protection and recovery service associate with a customer (or client system 110). Accordingly, a user such as a client support agent associated with the client support system 180 may provide various support services for the backup system 150. For example, a client support agent (or client support system 180) may provide a specialized access key (or access code, password, etc.) authorizing a client user associated with the client system 110 to access the backup system 150 with a service account (e.g., service level access).

Core files are a type of file containing a copy of some process's memory at a particular point in time and are often generated when a process abnormally exits, often due to a crash or some external signal. This generally coincides with some sort of bug or other unexpected behavior occurring in the software which may result in a customer escalating the issue to technical support. In order for support technicians to troubleshoot the issue, evidence is conventionally gathered from the system in the form of various logs, performance data, etc. This collection of data, when aggregated into a single collection, may constitute a support bundle. The support bundle, while useful, often contains an excess of data which may cause difficulties transferring it to support servers over a network connection, may create confusion, and take up an unnecessary amount of disk space on support network computing infrastructure.

Static core file analysis is a technique in which a core dump is inspected for information leading to a root cause of the program terminating. This complex process is often done by skilled support and engineering personnel, as it requires internal knowledge of the program that crashed and intuition identify possible explanations for the crash or unexpected behavior. However, parts of the debugging process may be automatable, and can paint a partial picture of the underlying problem. One such technique described herein is a system that attempts to correlate threads in the process to the actively running thread at the time of crash by way of program specific rules that establish relationships based on access to shared resources. From this bundle of threads, an analyzer module may be able to identify which sub-components of the program were involved at the time of the crash. The analyzer module may also identify potentially the most relevant sub-components, creating a weighted list of relevance in the process. This approach may be particularly useful for large, tightly coupled filesystem services composed of many sub-components, as it narrows the focus of analysis to a limited number of areas.

The list of involved sub-components may be used to determine which logs and other files may be most relevant to the crash. Each sub-component may have a list of files it wants to prioritize in the event it is involved in the crash as well as some static value measuring how important that file is to that sub-component. In order to generate a global list of prioritized files, this measure of importance may be combined with the file's sub-component's measure of relevance in order to produce a priority score for that file. Each of the ranked files can then be inserted into a single list in descending order of priority. This prioritized list may then be used to select the most important files to include for a given crash.

This method allows the system to create support bundles that attempt to maximize the value of information included when also facing some sort of constraint on creation of the bundle. If the total size of the bundle has a hard limit, this means packing the most valuable information per byte in that fixed space. Size constrained support bundles created in this method may have some additional benefits beyond simply transferring faster and taking up less space, such as fitting within the size requirements of some sort of automatic telemetry mechanism, enabling the transfer of more valuable system information to support even for issues that go unreported by customers.

Figure 2:
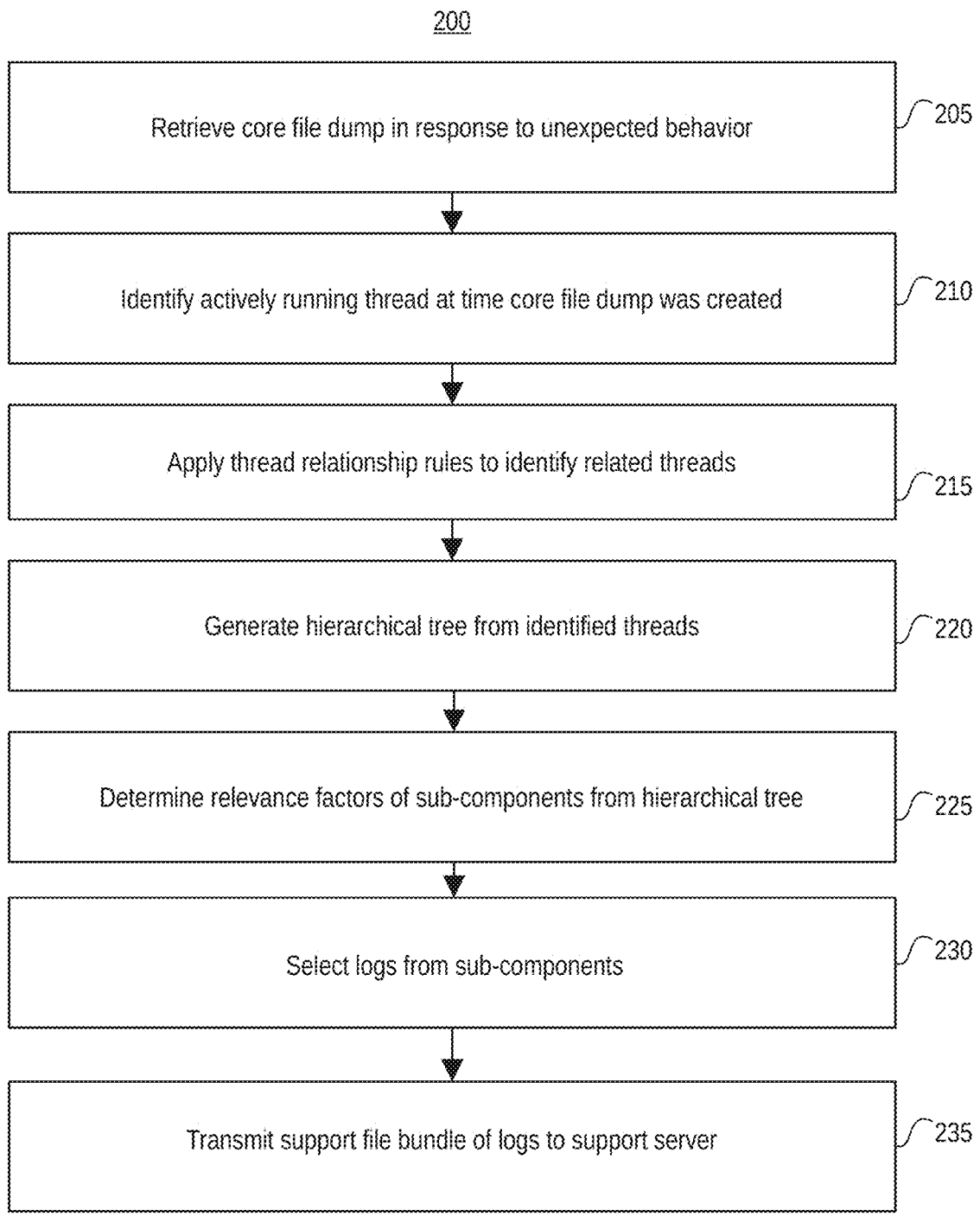
FIG. 2 is a flow diagram illustrating an example method for on-site filtering of logged files at the time of a file system crash before transmission according to one or more embodiments of the disclosure.

FIG. 2 is a flow diagram illustrating an example method 200 for on-site filtering of logged files at the time of a file system crash before transmission according to one or more embodiments of the disclosure. Method 200 uses a core dump file containing the process's memory at the time of crash to produce an ordered list of which components and subcomponents are most likely related to the underlying root cause. Elements in this list may be ordered by a relevance factor, which may also function as a modifier during the prioritization step following analysis of the core dump file in some embodiments. At step 205, an analyzer application executing on the same system as a filesystem application may retrieve a core file dump for the filesystem application in response to an unexpected behavior exhibited by the filesystem application. The unexpected behavior may often be a crash of the filesystem application, but may be any other detectable behavior exhibited by the filesystem application. Non-crash unexpected behaviors may include internal filesystem errors, such as accessing an invalid section of memory (segfault) or failing some sort of internal test (e.g., a check that causes a core dump if some value is false). Core dumps may also be initiated automatically by an outside source, which may transmit a request to the filesystem application for a core dump via a network communication. The externally-initiated request for a core dump may be triggered, for example, by the filesystem shutting down and becoming stalled for too long on standard requests made by the external application. When this happens, an external watchdog may send a signal to automatically kill the process of the filesystem application and dump the core files. Finally, a user may manually initiate a core file dump by sending a signal or using a tool like gcore, which may be built into the filesystem application.

From the core file dump, the analyzer application may identify an actively running thread from a plurality of threads of the filesystem application that was running at the time of the unexpected behavior at step 210. The filesystem application includes multiple threads, each with its own call stack which includes stack frames corresponding to actively running subroutines in the thread. At the time of the unexpected behavior, at least one thread will be actively running. As is understood by one of skill in the art, a thread may be defined as a part of a process executed by the filesystem application, and each thread utilizes one or more sub-components of the filesystem application. The sub-components, which may be logical constructs that manage resources such as program counters, registers, and memory, for example, may be shared among different threads, as will be further discussed below.

Figure 3:
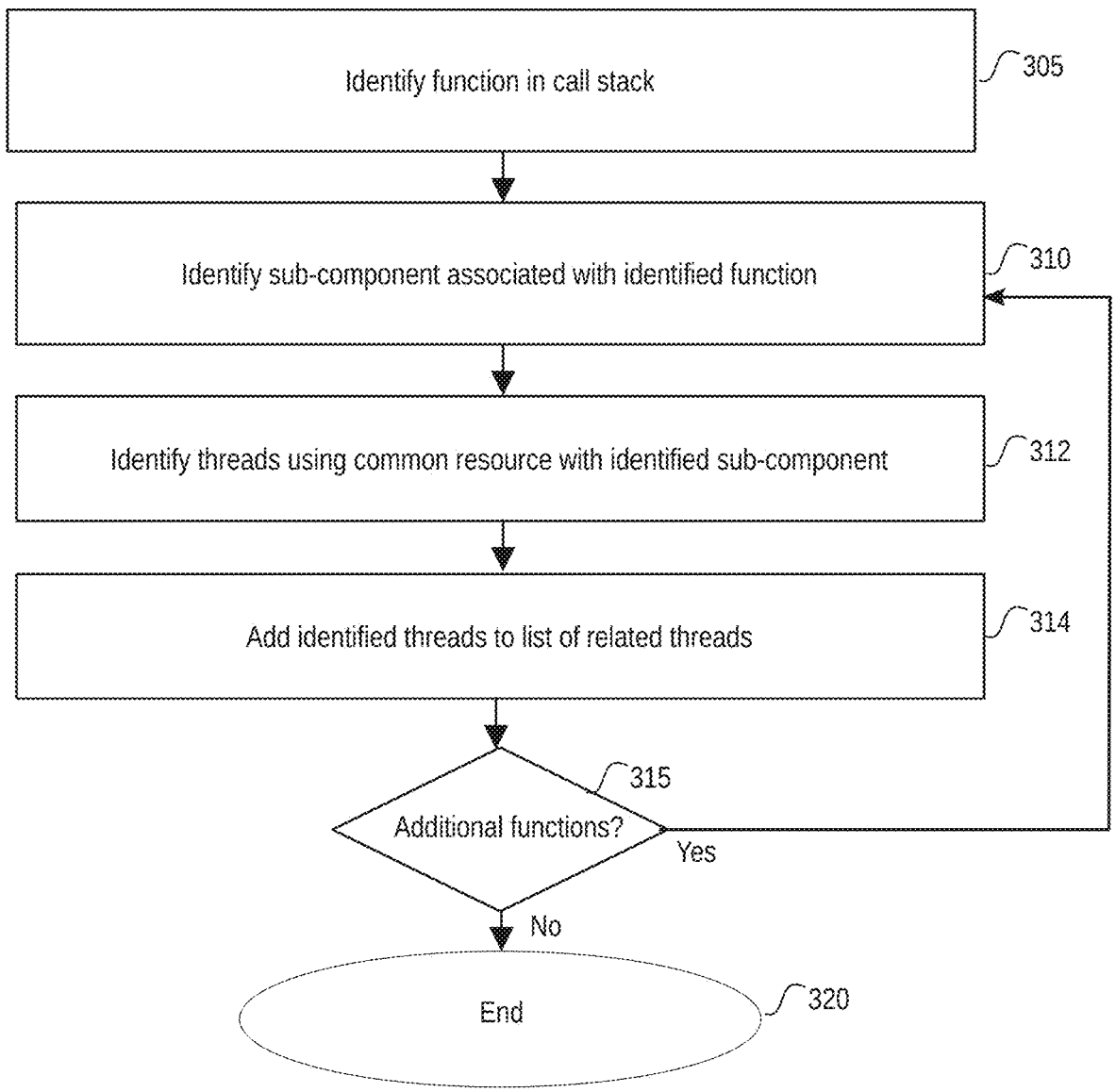
FIG. 3 is a flow diagram illustrating a method of applying thread relationship rules to identify related threads from an active thread at the time unexpected behavior is detected according to one or more embodiments of the disclosure.

At step 215, the analyzer application may apply one or more thread relationship rules to the one or more sub-components of the actively running thread to identify a plurality of related threads to the actively running thread. The thread relationship rules may add a thread to a list of the related threads when the thread uses a common resource with the one or more sub-components of the actively running thread. FIG. 3 is a flow diagram illustrating a method 300 of applying thread relationship rules to identify related threads from an active thread at the time unexpected behavior is detected, according to one or more embodiments of the disclosure. At step 305, a function called in the lowest frame of the call stack of the actively running thread is identified by the analyzer application running on the same system as the filesystem application. The function in the lowest frame of the call stack may be the first function in time called by the actively running thread. The analysis may proceed from the first function called, being the oldest in the stack, and proceed to newer functions called, which may ultimately be more pertinent to the cause of the unexpected behavior (since the filesystem application was operating as expected in the time before the unexpected behavior triggered the core dump).

Next, at step 310, the analyzer application identifies a sub-component of the filesystem application associated with the function called in the call stack frame being analyzed. The trace continues at step 312, where the thread relationship rules are applied to identify any other threads of the filesystem application that utilize a common resource with the identified sub-component, and step 314, where the threads utilizing the common resources are added to the list of the related threads. The thread relationship rules may be implementation specific to the process being analyzed, however they generally establish relationships by finding a shared resource between two threads. For example, consider a thread waiting to acquire a mutex. A rule may look at this mutex and find the thread which is currently holding the mutex in question in order to establish a relationship, as the thread holding the mutex is blocking the waiting thread and may be a cause of the unexpected behavior. The common resource may be any computing resource used by a thread in the filesystem application, and may at least include one of a locking structure, a pointer, messaging between the threads in question, or a mutex.

At step 315, the analyzer application moves to the next frame of the call stack to identify the next function that was called in chronological order. When the function being called has not been analyzed yet, the analyzer application repeats the identifying the sub-component and identifying the threads that utilize the common resource for each function in the call stack at steps 310, 312, and 314 for the unanalyzed function in the call stack. Upon reaching the top of the call stack, the analysis process may be applied to any identified threads among the related threads if they have not been visited yet. When there are no further functions to apply the thread relationship rules to, the method 300 ends at step 320.

Figure 4:
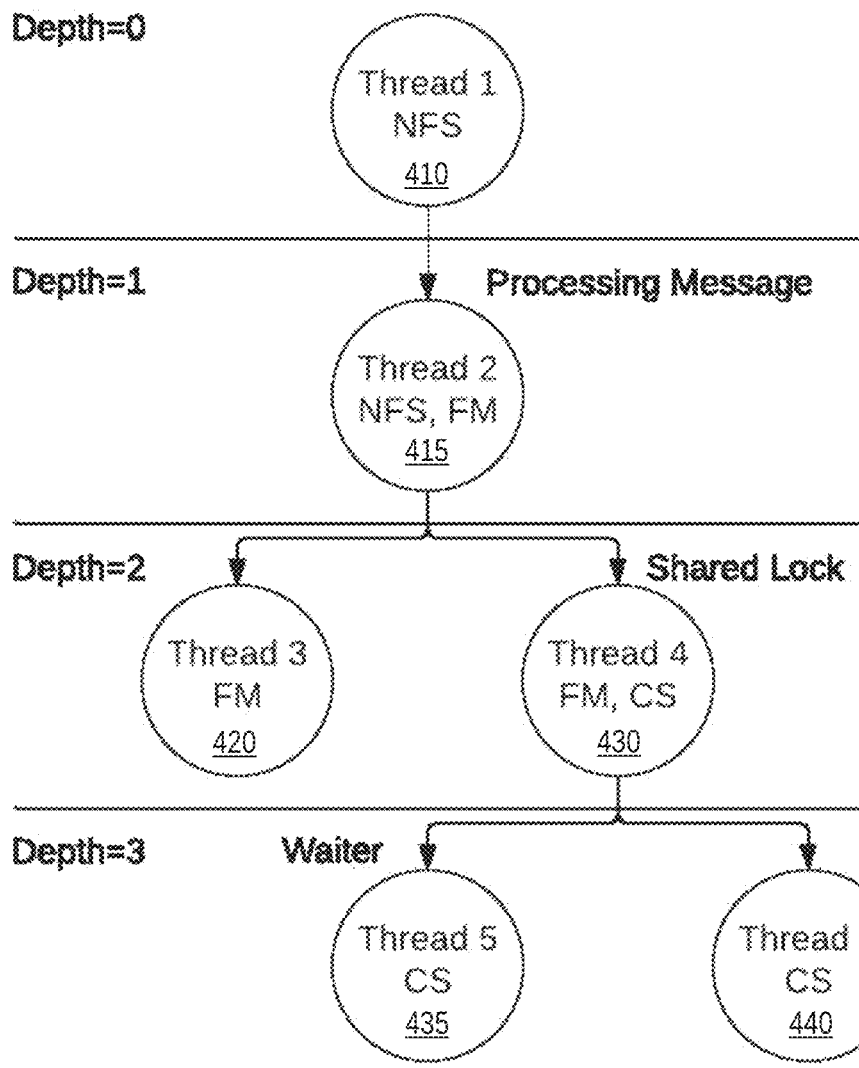
FIG. 4 is a block diagram illustrating an example hierarchical thread tree derived from an active thread at the time of a file system crash according to one or more embodiments of the disclosure.

Returning to FIG. 2, the analyzer application generates a hierarchical tree from the actively running thread and the identified plurality of related threads at step 220. The tree may be generated and stored in memory by the analyzer application in some embodiments. The hierarchical tree may have the actively running thread at the time of the core file dump at the top of the tree as the root node, and related threads being positioned based on degree of separation from the actively running thread. That is, the nodes of the hierarchical tree may be the identified threads, and each node may include a list of sub-components accessed by the referenced thread. The tree may be organized by the relationships of the threads to connected threads on the basis of a shared resource. From the generated hierarchical tree, the analyzer application may determine a relevance factor for each of the sub-components utilized by the threads in the hierarchical tree at step 225. The relevance factor for each sub-component may be determined based on a position of threads referencing each sub-component within the hierarchical tree, as will be discussed herein. FIG. 4 is a block diagram illustrating an example hierarchical thread tree 400 derived from an active thread at the time of a file system crash, with the table 445 listing the deepest nodes for each seen process sub-component, according to one or more embodiments of the disclosure. As seen in tree 400, each node of the tree may also contain a list of the sub-components seen in that thread. Accordingly, first thread 410 includes the network file system (NFS) sub-component, second thread 415 includes FS and file manager (FM) sub-components, third thread 420 includes the FM, fourth thread 430 includes the FM and CS sub-components, fifth thread 435 includes the CS, and sixth thread 440 includes the CS. As shown in hierarchical tree 400, second thread 415 was identified from thread relationship rules applied to first thread 410, so second thread 415 is a child of first thread 410 in the tree 400. The analyzer application was then able to identify third thread 420 and fourth thread 430 by applying the thread relationship rules to the second thread 415, making threads 420 and 430 children threads of second thread 415 in tree 400.

In addition to listing the threads and the sub-components, hierarchical tree 400 also displays the depth of the thread (i.e., degree of separation based on the number of degrees away from the actively running thread 410 in the tree 400), and the shared resource that the thread relationship rules used to add the thread to the tree. First thread 410 is the active thread at the time of the unexpected behavior and is assigned a depth of zero. Second thread 415 shared a processing message with first thread 410 and was accordingly added to the tree based on a thread relationship rule stating that any thread sharing processing messages with the thread being analyzed is related. Second thread 415 is directly related to actively running thread 410 by the thread relationship rule, and therefore is assigned a depth of 1 in the hierarchical tree. Third thread 420 and fourth thread 430 share a lock with second thread 415, and based on the shared resource, were also added to the list of related threads. Since threads 3 and 4 are two degrees removed from actively running first thread 410, they are assigned a depth of two in the hierarchical tree. Finally, thread 5 435 and sixth thread 440 share a waiter data structure (i.e., a structure used for threads to wait for signals to proceed from a different thread) with fourth thread 430 and are assigned a depth of three reflecting their distance from actively running first thread 410 in the tree.

Next, the relevance of each sub-component may be determined based on the depth of the associated threads in the hierarchical tree 400. For example, the deepest node a sub-component is seen in can be then used to calculate its relevance factor for determining priority order of log files in a later step. Deeper nodes may be assigned a higher relevance score, on the assumption that earlier nodes are simply stuck waiting for deeper nodes, with the deepest leaves of the tree being responsible for blocking all prior threads in the branch. In other words, the deeper in the tree the analyzer gets, the more likely it is that the analyzer is closer to the area causing the problem. The relevance factor R can be computed for a given sub-component in some embodiments by taking the ratio of deepest node a sub-component is seen $D_{comp}$ against the maximum depth of the tree $D_{TreeMax}$:

$$R = \frac{D_{comp}}{D_{TreeMax}}.$$

To avoid the case of a component at depth 0 having a relevance factor of 0.0, this calculation may include a constant B representing a base relevance factor. This value may act as a minimum relevance factor for any seen sub-component. The remaining difference between this base factor and the maximum relevance 1.0 can be scaled according to R and added to the base factor to yield $R_{adj}$. For values of $D_{TreeMax}>0$ this can be expressed as:

$$R_{adj} = B + \frac{D_{comp} - (B * D_{comp})}{D_{TreeMax}}.$$

Constant B can be adjusted to increase or decrease the impact the relevance factor has on later prioritization. For values of $D_{TreeMax}<=0$, $R_{adj}=1$. The below table contains example relevance factors for each of the sub-components seen in tree 400 assuming $D_{TreeMax}=3$ and B=0.5. In Table 1, the columns list the various sub-components, and the rows are the sub-component depth, relevance factor, and adjusted relevance factor, respectively.

TABLE 1

Example $R_{adj}$ values for FIG. 4 sub-components

| Subcomponent | NFS | FM | CS |
| --- | --- | --- | --- |
| $D_{comp}$ | 1 | 2 | 3 |
| R | 0.333 | 0.666 | 1.0 |
| $R_{adj}$ | 0.666 | 0.833 | 1.0 |

In some embodiments, the relevance factors may then be used to place each sub-component into a list ordered from highest relevance factor to lowest. In the above example, this would be the sub-components CS, FM, and NFS. The adjusted relevance factor may then be used to dynamically weight log files of each sub-component in the prioritization step, as further discussed below.

Figure 5:
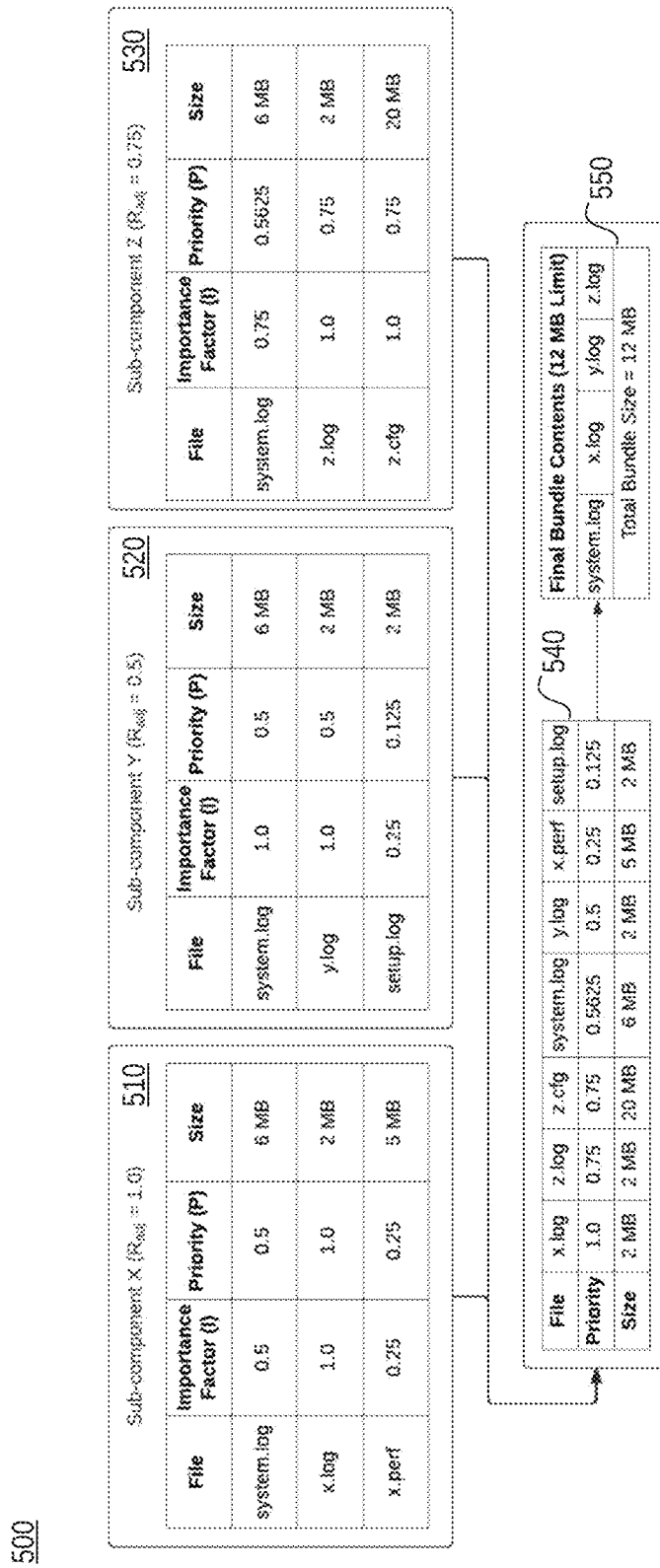
FIG. 5 illustrates generating a support bundle on-site based on a hierarchical thread tree according to one or more embodiments of the disclosure.

Again returning to FIG. 2, logs from the sub-components utilized by threads in the hierarchical tree may be selected based on the relevance factors of associated sub-components and file sizes of logs from the sub-components fitting within a predetermined bundle size at step 230. Once the logs have been selected to fill the predetermined bundle size, the selected logs may be bundled into a support file bundle and then transmitted, at step 235, to a support server (such as a telemetry back-end server, for example) via network connection. FIG. 5 illustrates generating a support bundle on-site based on a hierarchical thread tree using an exemplary prioritization method 500 according to one or more embodiments of the disclosure. The prioritization method 500 is an exemplary way of selecting logs for the support bundle from a list of log files ranked from highest priority to lowest. These logs may be selected, for example, by starting from the highest priority item in the log file list and working down the list, adding items to the support bundle until the system exceeds the space limitation of the bundle, which may be set as a predetermined bundle size by support staff.

Each sub-component of the filesystem application may have a static list of files to include in a support bundle if that sub-component is identified by the analyzer. The filesystem application itself may also have its own static list of files to include as well. Each file in each list may have a constant importance factor (I), ranging from 0.0 to 1.0 in an exemplary embodiment, that represents the general degree of usefulness that file has in debugging its process or process sub-component. As described above, the analyzer application may use thread relationship rules and the hierarchical tree to determine the adjusted relevance factor, $R_{adj}$, for each sub-component associated with the identified threads. This adjusted relevance factor can be treated as a weight for adjusting the importance factor of each file belonging to a sub-component in some embodiments. This may be done by taking the product of the sub-component's $R_{adj}$ and the file's importance factor, I, for every file in a sub-component's list of files. The result should be the weighted priority P of each log file. This is expressed as:

$$P = R_{adj} * I_{file}.$$

Method 500 illustrates three sub-components X, Y, and Z of an exemplary filesystem application. The three sub-component adjusted relevance factors $R_{adj}$ are shown, as are the importance factors I for each log file associated with the sub-components. The weighted priorities are also displayed for each log file, as well as the file sizes of each log file.

After individual file priorities are calculated, each sub-component's list of files may be joined into a singular list 540 and then sorted by the computed priorities in descending order. Duplicate files in the merged list will be removed in some embodiments, with the highest priority of the duplicates being retained. To generate the support bundle, the system begins at the top of the list and adds files to the support bundle in priority order. If a file is too large to fit within the remaining available space in the support bundle, that file shall be skipped, and the system moves to the next file in the list. This process shall repeat until either no additional files fit within the bundle or there are no remaining files in the list which are not already in the bundle. This is illustrated in example method 500, where the final support bundle 550 includes four log files within the predetermined 12-megabyte bundle size: system.log, x.log, y.log, and z.log. Log files x.log and z.log were the log files in log file list 540 having the highest priority. Log file z.cfg is the third-highest priority log file; however, z.cfg's 20-megabyte size exceeded the total bundle size limit of 12 megabytes, and accordingly was skipped in favor of the next two log files, which fit within the predetermined support bundle size limit.

As mentioned previously, the filesystem application itself may have a general list of files to include. If present, this list of files may be used to fill up any remaining space in the bundle only after the sub-component list has been exhausted. Sub-component files should always take precedence over the process's list, as the files included in the process's list may be more general in nature and less likely to be related to the unexpected behavior. This method for selecting log files for inclusion in the support file bundle may also be used in conjunction with other constraints on which files go into the support bundle, such as limits on the size of individual files, in various embodiments.

Overall, the systems and methods for the analyzer application described herein allow the system running the filesystem application to perform automated, on-system debugging of crashed filesystem services to determine which process sub-components are involved in a crash and their degree of relevance using depth-based approach with tree of related threads. Degrees of relevance for system sub-components derived from analysis of core file, combined with lists of files related to those sub-components, weighted by importance in some embodiments, are used to dynamically prioritize files more likely to be useful in a bundle of logs created for a given crash. This may maximize the value of a fixed size bundle using thread tree based static analysis of core file at crash time to send unique, customized bundles back to support automatically. Thread tree depth is used as a novel measure of relevance for the analyzer application to start from the active thread and trace back to what, based on the thread relevance rules, is likely to be the problematic thread. As the distance between this problematic thread and the original increases, the earlier threads in the chain may become slightly less important, which is reflected in the lower priority assigned to threads higher in the hierarchical tree.

The described embodiments above discuss the automatic on-system collection of logs uses a fixed list of files to include without regard to specific constraints. Should constraints be applied to these bundles in order to address problems outlined earlier, this prioritized list can be used to fill the bundle with the most meaningful information that still fits within the limits on the bundle. For the case of space constraints, for example, this means faster transfer of bundles, less wasted space on both customer and support systems, less noisy information to sift through, and the ability to create specifically sized bundles suitable for automatically sending back to support for all issues (including unreported ones for which there is otherwise no data). That is, in some embodiments, instead of basing the generation and transmission of a support bundle in response to an event, such as a crash, support bundles may be sent based on a predetermined period of time elapsing. Another benefit to performing this analysis following unexpected behavior is that these bundles should contain a very recent set of logs, avoiding the issue of log roll-over.

Figure 6:
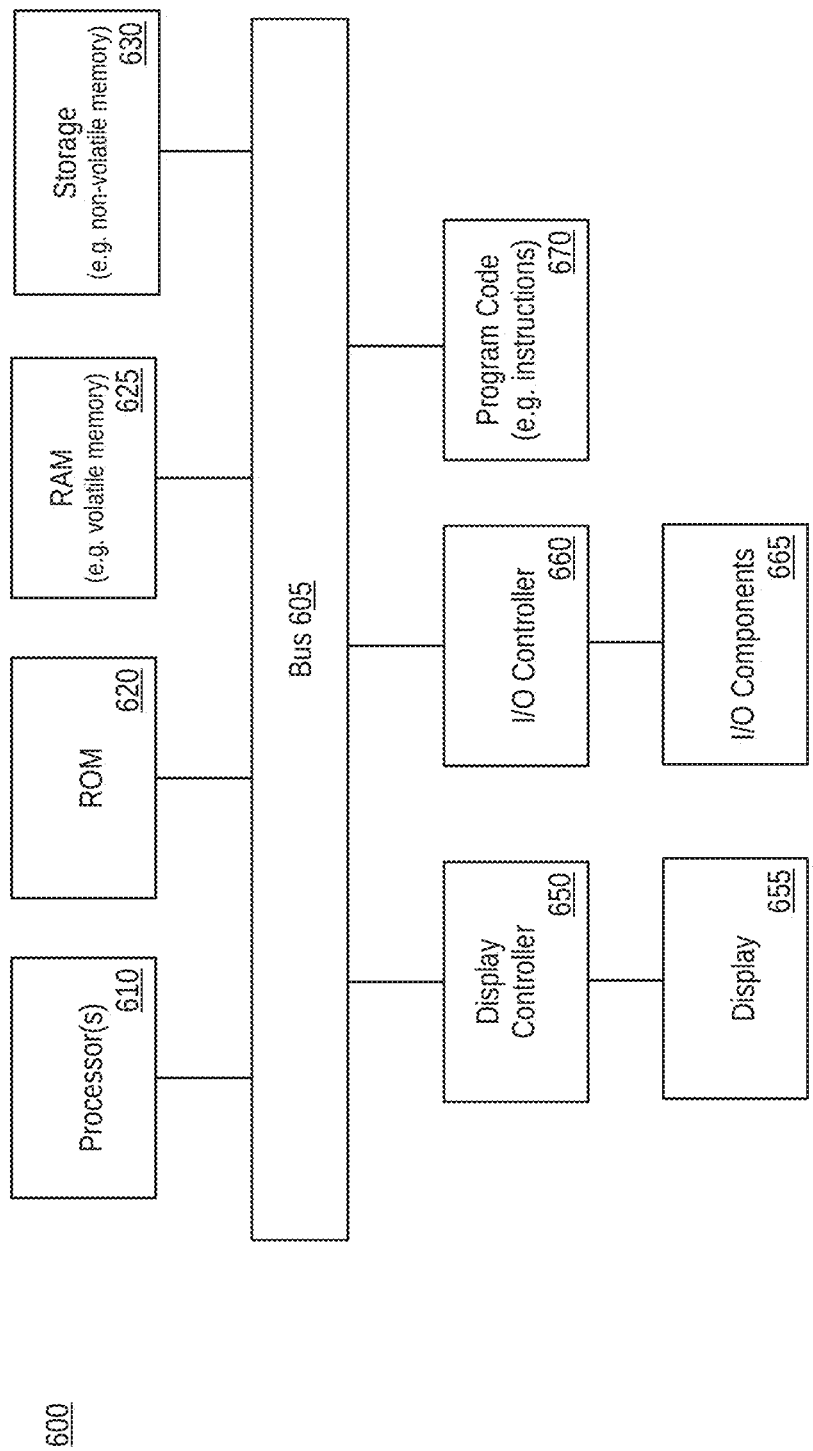
FIG. 6 is a block diagram illustrating an example computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g., backup system 150, operating environment 100, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g., within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g., within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g., accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g., backup system 150). Program code 670 may reside, completely or at least partially, within the memories described herein (e.g., non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
      retrieve, by an analyzer application, a core file dump for a filesystem application in response to an unexpected behavior exhibited by the filesystem application, the analyzer application executing on the same system as the filesystem application;
      identify, by the analyzer application, an actively running thread, from a plurality of threads, at a time the core file dump was generated, each thread utilizing one or more sub-components of the filesystem application;
      apply one or more thread relationship rules to the one or more sub-components of the actively running thread to identify a plurality of related threads to the actively running thread, the thread relationship rules adding a thread to a list of the related threads when the thread uses a common resource with the one or more sub-components of the actively running thread;
      determine a relevance factor for each of the sub-components utilized by the actively running thread and the list of related threads, the relevance factor for each sub-component being determined based on a position of threads referencing each sub-component within a hierarchical tree generated from the actively running thread and the list of related threads; and
      generate a support file bundle including selected logs from the sub-components utilized by threads in the hierarchical tree, the selection being based on the relevance factors of the sub-components and the file sizes of the selected logs fitting within a predetermined bundle size.

2. The system of claim 1, the applying the one or more thread relationship rules to the one or more sub-components of the actively running thread comprising identifying a lowest function in a call stack associated with the actively running thread, identifying a sub-component associated with the lowest function, identifying any threads that utilize a common resource with the identified sub-component, adding the threads utilizing the common resource to the list of the related threads, and repeating the identifying the sub-component and identifying the threads that utilize the common resource for each function in the call stack.

3. The system of claim 2, the instructions further comprising instructions to repeat the identifying the sub-component and identifying the threads that utilize the common resource for each of the related threads.

4. The system of claim 1, wherein the common resource is at least one of a locking structure, a pointer, memory, messaging between the threads in question, or a mutex.

5. The system of claim 1, the hierarchical tree including each sub-component utilized of threads being displayed and being generated by assigning the related threads a depth in the hierarchical tree based on degree of separation from the actively running thread.

6. The system of claim 1, the relevance factor of each sub-component being based on the depth in the hierarchical tree of a deepest thread associated with each sub-component.

7. The system of claim 1, the generating the support file bundle further comprising determining a priority of each log file associated with the selected sub-components based on the relevance factor for the subcomponent and a predetermined importance factor associated with each log file, generating a merged list of log files including the priorities of each log file of each of the selected sub-components, and adding the log files having the highest priority value until no further log files may be added to the support bundle, wherein log files having a size that exceeds the predetermined bundle size are omitted.

8. The system of claim 1, the instructions further comprising instructions to transmit the support file bundle including only the selected logs, via network connection, to a support server.

9. A method for on-site filtering and prioritizing logged data prior to transmission to a support server, the method comprising:
   retrieving, by an analyzer application, a core file dump for a filesystem application in response to an unexpected behavior exhibited by the filesystem application, the analyzer application executing on the same system as the filesystem application;
   identifying, by the analyzer application, an actively running thread, from a plurality of threads, at a time the core file dump was generated, each thread utilizing one or more sub-components of the filesystem application;
   applying one or more thread relationship rules to the one or more sub-components of the actively running thread to identify a plurality of related threads to the actively running thread, the thread relationship rules adding a thread to a list of the related threads when the thread uses a common resource with the one or more sub-components of the actively running thread;
   determining a relevance factor for each of the sub-components utilized by the actively running thread and the list of related threads, the relevance factor for each sub-component being determined based on a position of threads referencing each sub-component within a hierarchical tree generated from the actively running thread and the list of related threads; and
   generating a support file bundle including selected logs from the sub-components utilized by threads in the hierarchical tree, the selection being based on the relevance factors of the sub-components and the file sizes of the logs fitting within a predetermined bundle size.

10. The method of claim 9, the applying the one or more thread relationship rules to the one or more sub-components of the actively running thread comprising identifying a lowest function in a call stack associated with the actively running thread, identifying a sub-component associated with the lowest function, identifying any threads that utilize a common resource with the identified sub-component, adding the threads utilizing the common resource to the list of the related threads, and repeating the identifying the sub-component and identifying the threads that utilize the common resource for each function in the call stack.

11. The method of claim 10, further comprising repeating the identifying the sub-component and identifying the threads that utilize the common resource for each of the related threads.

12. The method of claim 9, wherein the common resource is at least one of a locking structure, a pointer, memory, messaging between the threads in question, or a mutex.

13. The method of claim 9, the hierarchical tree including each sub-component utilized of threads being displayed and being generated by assigning the related threads a depth in the hierarchical tree based on degree of separation from the actively running thread.

14. The method of claim 9, the relevance factor of each sub-component being based on the depth in the hierarchical tree of a deepest thread associated with each sub-component.

15. The method of claim 9, the generating the support file bundle further comprising determining a priority of each log file associated with the selected sub-components based on the relevance factor for the subcomponent and a predetermined importance factor associated with each log file, generating a merged list of log files including the priorities of each log file of each of the selected sub-components, and adding the log files having the highest priority value until no further log files may be added to the support bundle, wherein log files having a size that exceeds the predetermined bundle size are omitted.

16. The method of claim 9, further comprising transmitting the support file bundle including only the selected logs, via network connection, to a support server.

17. A computer program product comprising a non-transitory computer-readable medium having a computer-readable program code embodied therein to be executed by one or more processors of a client system, the program code including instructions to:
retrieve, by an analyzer application, a core file dump for a filesystem application in response to an unexpected behavior exhibited by the filesystem application, the analyzer application executing on the same system as the filesystem application;
identify, by the analyzer application, an actively running thread, from a plurality of threads, at a time the core file dump was generated, each thread utilizing one or more sub-components of the filesystem application;
apply one or more thread relationship rules to the one or more sub-components of the actively running thread to identify a plurality of related threads to the actively running thread, the thread relationship rules adding a thread to a list of the related threads when the thread uses a common resource with the one or more sub-components of the actively running thread;
determine a relevance factor for each of the sub-components utilized by the actively running thread and the list of related threads, the relevance factor for each sub-component being determined based on a position of threads referencing each sub-component within a hierarchical tree generated from the actively running thread and the list of related threads; and
generate a support file bundle including selected logs from the sub-components utilized by threads in the hierarchical tree, the selection being based on the relevance factors of the sub-components and the file sizes of the logs fitting within a predetermined bundle size.

18. The computer program product of claim 17, the applying the one or more thread relationship rules to the one or more sub-components of the actively running thread comprising identifying a lowest function in a call stack associated with the actively running thread, identifying a sub-component associated with the lowest function, identifying any threads that utilize a common resource with the identified sub-component, adding the threads utilizing the common resource to the list of the related threads, and repeating the identifying the sub-component and identifying the threads that utilize the common resource for each function in the call stack.

19. The computer program product of claim 17, wherein the common resource is at least one of a locking structure, a pointer, memory, messaging between the threads in question, or a mutex.

20. The computer program product of claim 17, the generating the support file bundle further comprising determining a priority of each log file associated with the selected sub-components based on the relevance factor for the sub-component and a predetermined importance factor associated with each log file, generating a merged list of log files including the priorities of each log file of each of the selected sub-components, and adding the log files having the highest priority value until no further log files may be added to the support bundle, wherein log files having a size that exceeds the predetermined bundle size are omitted.

* * * * *